United States Patent [19]
Lew

[11] Patent Number: 5,503,021
[45] Date of Patent: * Apr. 2, 1996

[54] OSCILLATORY PRESSURE SENSOR

[76] Inventor: Hyok S. Lew, 7890 Oak St., Arvada, Colo. 80005

[*] Notice: The portion of the term of this patent subsequent to Oct. 10, 2012, has been disclaimed.

[21] Appl. No.: 280,216

[22] Filed: Jul. 25, 1994

Related U.S. Application Data

[63] Continuation-in-part of Ser. No. 248,354, May 24, 1994, and a continuation-in-part of Ser. No. 34,516, Mar. 19, 1993, which is a continuation-in-part of Ser. No. 772,964, Oct. 8, 1991, Pat. No. 5,214,965, and a continuation of Ser. No. 860,767, Mar. 23, 1992, abandoned.

[51] Int. Cl.$^6$ .................................................. G01F 1/32
[52] U.S. Cl. .......................... 73/661; 73/861.24; 310/321
[58] Field of Search .................................. 73/661, 861.24, 73/861.22, 861.18; 310/321, 338, 324

[56] References Cited

U.S. PATENT DOCUMENTS

5,456,116  10/1995  Lew .............................. 73/661

Primary Examiner—Richard Chilcot
Assistant Examiner—Jewel V. Artis

[57] ABSTRACT

An oscillatory pressure sensor providing an alternating electrical signal representing an oscillation in differential pressure comprises a piezo electric transducer contained within a cavity included in the sensor body in a compressed relationship between two opposite thin side walls of the cavity, which two opposite thin side walls are respectively connected to deflective portions of two thin deflective partitioning walls respectively constituting a planar barrier between two fluid pressures, wherein the combination of deflective motions of the two thin deflective partitioning walls produced by the differential pressure thereacross induces an alternating stress in a piezo electric disc included in the piezo electric transducer and generates an alternating electrical signal from the piezo electric transducer.

20 Claims, 4 Drawing Sheets

OSCILLATORY PRESSURE SENSOR

This patent application is a Continuation-In-Part to patent application Ser. No. 08/248,354 entitled "Oscillatory Pressure Transducer" filed on May 24, 1994, and to patent application Ser. No. 08/034,516 entitled "Piezo Electric Relative Vibration Sensor" filed on Mar. 19, 1993 that is a Continuation-In-Part to patent application Ser. No. 07/772,964, now U.S. Pat. No. 5,214,965 and a Continuation to patent application Ser. No. 07/860,767, now abandoned.

FIELD OF INVENTION

This invention relates to an apparatus detecting an oscillation or fluctuation in the fluid pressure and measuring the frequency of the oscillation in the fluid pressure, which apparatus has a particularly important application in detecting low amplitude pressure fluctuations such as those occurring in conjunction with vortex shedding in vortex flowmeters.

BACKGROUND OF INVENTION

One of the most sensitive and accurate versions of the vortex flowmeter can be constructed by using a highly sensitive oscillatory pressure sensor, that detects the oscillating differential pressure across a plane of symmetry of a vortex generating bluff body. When the fluid velocity becomes very low, the amplitude of the alternating differential pressure oscillation associated with the vortex shedding from the vortex generating bluff body becomes extremely low and, consequently, the measurement of the fluid velocity as a function of the vortex shedding frequency encounters a serious obstacle arising from the difficulty in counting the vortex shedding frequency accurately. In theory, the amplitude of an alternating electrical signal generated by an oscillatory pressure sensor or transducer can be brought up to any desirable level by supplying the two fluid pressures respectively existing on the two opposite cylindrical sides of the vortex generating bluff body into two pressure compartments separated from one another by a thin deflective partitioning wall of a large surface area, and by detecting the force or deflection experienced by the thin deflective partitioning wall. The parent patent and patent applications have disclosed a number of pioneering and highly successful versions of the vortex flowmeter and the oscillatory pressure transducers operating on the above-described theory.

BRIEF DESCRIPTION OF INVENTION

The primary object of the present invention is to provide an oscillatory pressure sensor or transducer comprising a piezo electric stress or displacement transducer disposed within a cavity included in the apparatus body in a compressed relationship between two opposite thin side walls of the cavity, which two opposite thin side walls are respectively connected to deflective portions of two thin deflective partitioning walls respectively constituting a planar barrier between two fluid pressures, wherein at least one of the two fluid pressures oscillates or fluctuates in creating the oscillation in the differential pressure across the thin deflective partitioning walls.

Another object is to provide the oscillatory pressure sensor described in the afore-mentioned primary object of the present invention, wherein each of the two opposite thin side walls of the cavity is connected to each of the two thin deflective partitioning walls by a force transmitting member extending from the thin side wall of the cavity and connected to or in contact with a deflective portion of the thin deflective partitioning wall.

A further object is to provide the oscillatory pressure sensor described in the primary object of the invention, wherein each of the two opposite thin side walls of the cavity is connected to each of the two thin deflective partitioning walls by a portion of a bent edge or an angled extension of an edge of the thin deflective partitioning wall anchored to the thin side wall of the cavity.

Yet another object is to provide the oscillatory pressure sensor described in the afore-mentioned another and a further objects of the invention, wherein each of the two opposite thin side walls of the cavity includes a reinforcing rib disposed thereacross on a reference plane defining an antisymmetry thereabout in the deflective motion of the thin side wall, which reinforcing rib anchors the force transmitting member or the portion of the bent edge or the angled extension of an edge of the thin deflective partitioning wall.

Yet a further object is to provide a compound version of the oscillatory pressure sensor described in the primary object of the invention, wherein a pair of the oscillatory sensors are disposed in a mirror image to one another about a plane of symmetry, and two alternating electrical signals respectively generated by the pair of oscillatory pressure sensors are combined in such a way that the noise created by the mechanical vibrations of the apparatus body is cancelled therebetween and a resultant alternating electrical signals exclusively representing the oscillation in the differential pressure is obtained.

Still another object is to provide an oscillatory pressure sensor comprising a piezo electric stress or displacement transducer disposed within a cavity included in the apparatus body in a compressed relationship between two opposite thin side walls of the cavity, which two opposite thin side walls respectively include two force transmitting members respectively extending therefrom and connected to or in contact with a central portion of a single thin deflective partitioning wall constituting a planar barrier between two fluid pressures, wherein at least one of the two fluid pressures oscillates or fluctuates in creating the oscillation in the differential pressure across the single thin deflective partitioning wall.

Still a further object is to provide a compound version of the oscillatory pressure sensor described in the afore-mentioned still another object of the invention, wherein a pair of the oscillatory pressure sensors are disposed in a mirror image to one another about a plane of symmetry disposed intermediate the single thin deflective partitioning walls respectively belonging to the pair of the oscillatory pressure sensors in such a way that a first pressure compartment disposed intermediate the pair of the single thin deflective partitioning walls is separated from a second and third pressure compartment open to one another and straddling the combination of the pair of the single thin deflective partitioning walls respectively by the pair of the single thin deflective partitioning walls, wherein two alternating electrical signals respectively generated by the pair of oscillatory pressure sensors are combined in such a way that the noise created by the mechanical vibrations of the apparatus body is cancelled therebetween and a resultant alternating electrical signal exclusively representing the oscillation in the differential pressure between the first pressure compartment and the combination of the second and third pressure compartments is obtained.

These and other objects of the present invention will become clear as the description of the invention progresses.

BRIEF DESCRIPTION OF FIGURES

The present invention may be described with a greater clarity and specificity by referring to the following figures.

DESCRIPTION OF ILLUSTRATED EMBODIMENTS

Figure 1:
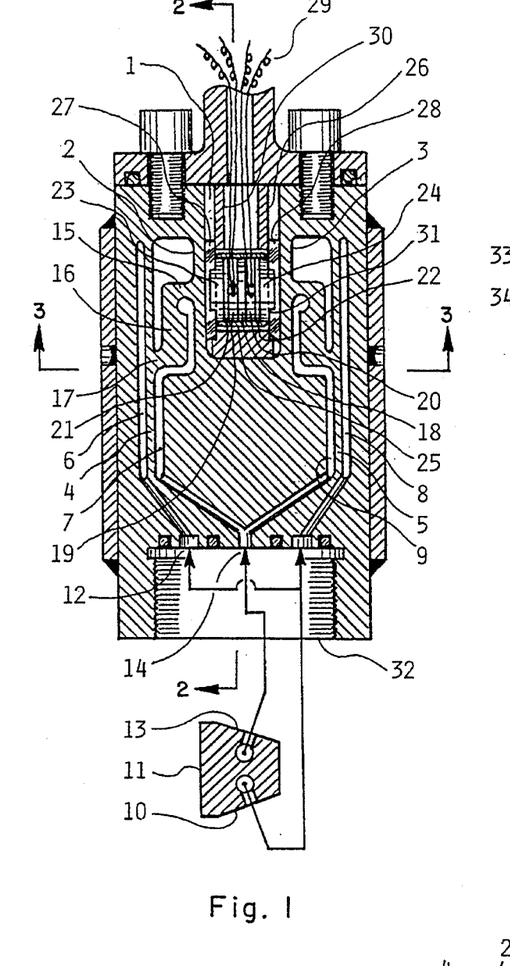
FIG. 1 illustrates a cross section of an embodiment of the oscillatory pressure sensor of the present invention.

In FIG. 1 there is illustrated a cross section of an embodiment of the oscillatory pressure sensor constructed and operating in accordance with the principles of the present invention. The body of the apparatus includes a cavity 1 with two opposite thin side walls 2 and 3, and a first and second thin deflective partitioning walls 4 and 5 respectively constituting a first pressure barrier between two fluid pressures respectively contained in two pressure compartments 6 and 7, and a second pressure barrier between two fluid pressures respectively contained in two pressure compartments 8 and 9. A first fluid presssure such as that existing on one cylindrical side 10 of a vortex generating bluff body 11 is supplied to the pressure compartments 6 and 8 through a common annular pressure port 12 including two pressure holes respectively open to the two pressure compartments 6 and 8, while a second fluid pressure such as that existing on the other cylindrical side 13 of the vortex generating bluff body 11 is supplied to the pressure compartments 7 and 9 through a centrally located pressure port 14 that bifurcates into two pressure holes respectively open to the two pressure compartments 7 and 9. Each of the two opposite thin side walls 2 and 3 of the cavity 1 includes a reinforcing rib 15 disposed diametrically across the thin side wall of the cavity 1 on a reference plane perpendicular to and dividing both of the two opposite thin side walls 2 and 3 into two opposite equal halves, and further includes a force transmitting member 16 anchored to the reinforcing rib 15 of the thin side wall-and extending therefrom, which force transmitting member 16 is connected to or in contact with a deflective portion such as a central portion 17 of each of the two thin deflective partitioning walls 4 and 5, that constitutes the pressure barrier between the two fluid pressures respectively supplied through the two pressure ports 12 and 14. It should be understood that the cavity I is surrounded by the two opposite thin side walls 2 and 3, and other rigid walls, which combination constitutes a leak-proof barrier isolating the interior region of the cavity 1 from the fluid occupying the pressure compartments 6, 7, 8 and 9, whereby the fluid does not contaminate the electrical elements making up the piezo electric transducer contained within the cavity 1. It should be mentioned that only one of the two fluid pressures respectively supplied to the two pressure ports 12 and 14 may oscillate in the application of the oscillatory pressure sensor of the present invention, wherein the nonoscillating pressure supplied to one of the two pressure ports 12 and 14 can be vacuum. In the particular illustrative embodiment, the two fluid pressures respectively supplied to the two pressure ports 12 and 14 oscillates in an antisymmetric mode with respect to one another The piezo electric transducer disposed within the cavity 1 comprises a stacked combination of a piezo electric disc 18 sandwiched between a pair of electrode discs 19 and 20, a pair of insulator discs 21 and 22, and a pair of back-up discs 23 and 24, which stacked combination of the elements is wrapped with an insulating tape or sheathed by an insulating cylindrical shell 25, and disposed intermediate the two opposite thin side walls 2 and 3 of the cavity 1. The transducer holder 26 is used to insert the stacked combination of the transducer elements into the cavity 1 and the pair of wedge plates 27 and 28 respectively pressed into the spacings between the two opposite end faces of the stacked combination of the transducer elements and the two opposite thin side walls 2 and 3 of the cavity 1 are employed to establish the compressed placement of the stacked combination of the transducer elements between the two opposite thin side walls 2 and 3 of the cavity 1. Each of the pair of electrodes 19 and 20 is split into two semicircular halves respectively located on two opposite sides of the reference plane including the reinforcing ribs 15 of the two opposite thin side walls 2 and 3 of the cavity 1. The lead wires 29 respectively extending from the semicircular electrodes provided by the pair of electrode discs 19 and 20 are routed through a hole 30 included in the transducer holder 26 and out of the apparatus body. It should be noticed that the out side face of each of the pair of back-up discs 23 and 24 includes a diametrically extending grooved seat 31 receiving each of the pair of wedge plates 27 and 28. While a construction placing the two force transmitting members 16 respectively connecting the two opposite thin side walls 2 and 3 of the cavity 1 to the two thin deflective partitioning walls 4 and 5 intermediate the two thin deflective partitioning walls is employed in the particular illustrative embodiment, in an alternative embodiment the two thin deflective partitioning walls 4 and 5 may be disposed intermediate the two force transmitting members 16 now having a greater length. It should be mentioned that, when the oscillatory pressure sensor is used to generate an alternating electrical signal representing the vortex shedding from a vortex generating bluff body as shown in the particular illustrative embodiment, the vortex generating bluff body 11 has a cylindrical extension threadedly engaging the extremity 32 of the oscillatory pressure sensor in such a way that a first pressure communicating hole included in the cylindrical extension in an offset relationship from the central axis thereof connects the pressure receiving holes open to one cylindrical side 10 of the bluff body 11 to the first pressure port 12 having the annular groove shape, while a second pressure communicating hole included in the cylindrical extension in a centered relationship connects the pressure receiving holes open to the other cylindrical side 13 of the bluff body 11 to the centrally located second pressure port 14.

Figure 2:
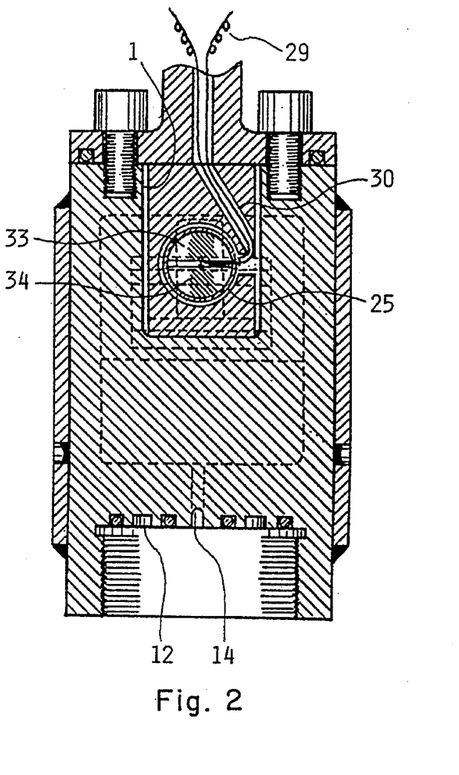
FIG. 2 illustrates another cross section of the oscillatory pressure sensor shown in FIG. 1.

In FIG. 2 there is illustrated another cross section of the oscillatory pressure sensor shown in FIG. 1, which cross section taken along plane 2—2 as shown in FIG. 1 shows the two semicircular electrodes 33 and 34 provided by one of the pair of electrode discs 19 and 20, and two of the plurality of lead wires 29 respectively extending from the two semicircular electrodes 33 and 34, and routed through the lead wire routing hole 30 included in the transducer holder 26. It should be noticed that the cavity 1 containing the piezo electric transducer has rigid walls in addition to the two opposite thin side walls 2 and 3, which combination of the walls surrounds the interior region of the cavity 1 and seals off the piezo electric transducer in a leak-proof relationship from the fluid occupying the pressure compartments 6, 7, 8 and 9. The lead wire routing hole 30 may be left open or sealed off by using a plug seal made of glass or other electrically insulating material, through which plug seal the lead wires 29 extend through in a leak-proof relationship.

Figure 3:
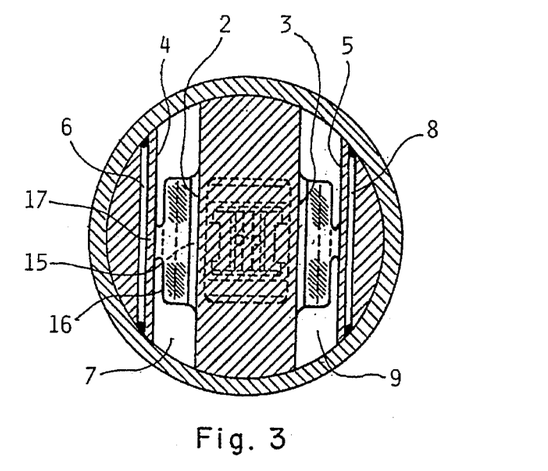
FIG. 3 illustrates a further cross section of the oscillatory pressure sensor shown in FIG. 1.

In FIG. 3 there is illustrated a further cross section of the oscillatory pressure sensor shown in FIG. 1, which cross section taken along plane 3—3 as shown in FIG. 1 shows the two opposite thin side walls 2 and 3 of the cavity 1, the two thin deflective partitioning walls 4 and 5, the pressure compartments 6, 7, 8 and 9, and the force transmitting member 16 with one extremity anchored to the reinforcing rib 15 of each of the two opposite thin side walls 2 and 3 of the cavity 1 and the other extremity connected to or in contact with a deflective portion such as the central portion of each of the two thin deflective partitioning walls 4 and 5.

Figures 4, 5:
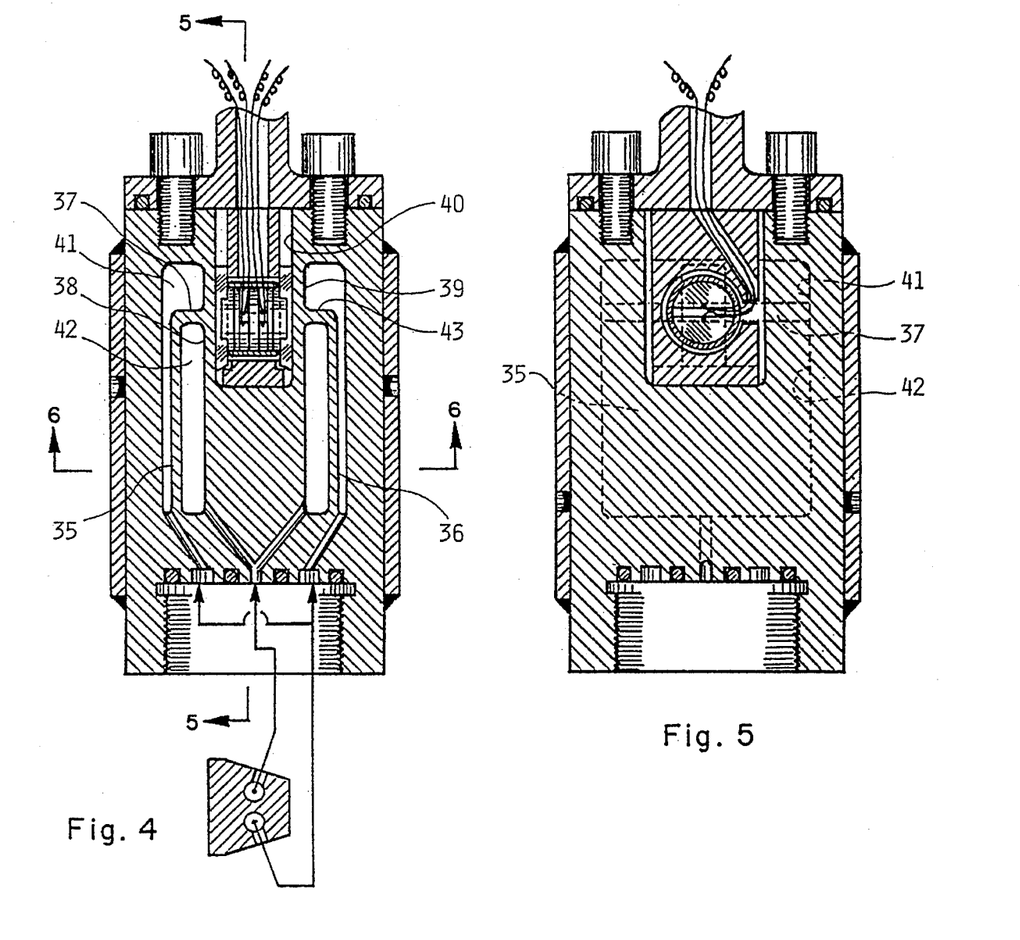
FIG. 4 illustrates a cross section of another embodiment of the oscillatory pressure sensor of the present invention.
FIG. 5 illustrates another cross section of the oscillatory pressure sensor shown in FIG. 4.

In FIG. 4 there is illustrated a cross section of another embodiment of the oscillatory pressure sensor of the present invention, that has essentially the same construction as the construction of the embodiment shown in FIGS. 1, 2 and 3 with one exception, that is the elimination of the force transmitting members 16 connecting the two opposite thin side walls 2 and 3 of the cavity 1 containing the piezo electric transducer respectively to the two thin deflective partitioning walls 4 and 5 as shown in FIG. 1. In this particular illustrative embodiment, each of the two thin deflective partitioning walls 35 and 36 has a bent edge 37 that is anchored in part to each of the two opposite thin side walls 38 and 39 of the cavity 40 containing the piezo electric transducer and in part to a wall of the combination of the each of the two pair of the pressure compartments 41 and 42. It should be noticed that a central portion of the angled extension 43 of the bent edge 37 of the each of the two thin deflective partitioning walls 35 and 36, which central portion is disposed on the reference plane and anchored to each of the two opposite thin side walls 38 and 39 of the cavity 40, plays the same role as that of the reinforcing rib 15 included in the embodiment shown in FIGS. 1, 2 and 3.

In FIG. 5 there is illustrated another cross section of the oscillatory pressure sensor shown in FIG. 4, which cross section taken along plane 5—5 as shown in FIG. 4 shows in broken lines the outline of the combination of the two pressure compartments 41 and 42 separated from one another by the thin deflective partitioning wall 35 having the bent edge 37 including the angled extension 43 laterally extending therefrom.

Figure 6:
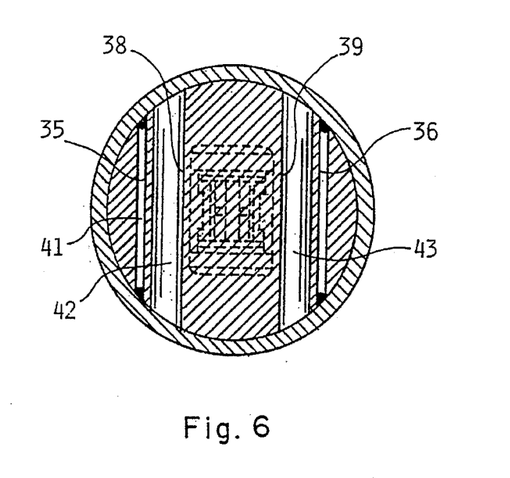
FIG. 6 illustrates a further cross section of the oscillatory pressure sensor shown in FIG. 4.

In FIG. 6 there is illustrated a further cross section of the oscillatory pressure sensor shown in FIG. 4, which cross section taken along plane 6—6 as shown in FIG. 4 shows the two opposite thin side walls 38 and 39 of the cavity 40, the two thin deflective partitioning walls 35 and 36 respectively separating the two pressure compartments 41 and 42, etc. from one another, and the angled extension 43 of the bent edge 37 included in each of the two thin deflective partitioning walls 35 and 36, which angled extension 43 is anchored in part to each of the two opposite thin side walls 38 and 39 of the cavity 40 containing the piezo electric transducer. It should be noticed that the embodiments shown in FIG.1 and 4 have a construction symmetric about a plane of symmetry located intermediate and parallel to the two opposite thin side walls of the cavity containing the piezo electric transducer and intermediate the two thin deflective partitioning walls. As a consequence, the mechanical vibrations of the apparatus body produces the deflective motions of the two thin deflective partitioning walls in a mostly symmetric mode with respect to the plane of symmetry, while the oscillating differential pressures across the thin deflective partitioning walls produce the deflective motions of the two thin deflective partitioning walls in a mostly antisymmetric mode with respect to the plane of symmetry. The piezo electric transducer contained within the cavity of the apparatus body detects only the antisymmetric component of the deflective motions of the two thin deflective partitioning walls. Therefore, the oscillatory pressure sensors shown in FIGS. 1 and 4 generate an alternating electrical signal representing only the antisymmetric component of the deflective motions of the two thin deflective partitioning walls and, consequently, the alternating electrical signal exclusively represents the oscillation in the differential pressure.

Figure 7:
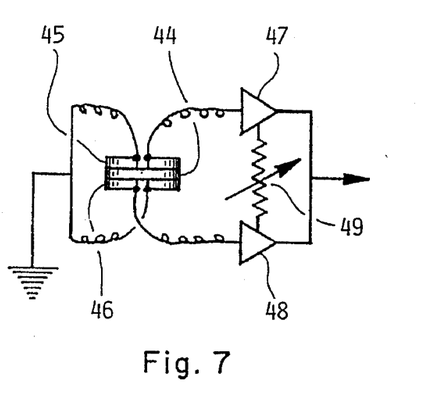
FIG. 7 illustrates an embodiment of the piezo electric transducer usable in the construction of the oscillatory pressure sensors of the present invention.

In FIG. 7 there is illustrated an embodiment of the piezo electric transducer comprising a piezo electric disc 44 sandwiched between a pair of electrode discs 45 and 46, which combination is to be sandwiched between the pair of insulator discs 21 and 22 as shown in FIG. 1. Each of the pair of electrode discs 45 and 46 is split into two semicircular electrodes along the reference plane including the reinforcing ribs 15 of the two opposite thin side walls of the cavity 1 as explained in conjunction with FIG. 1. One electrode in contact with one side face of the piezo electric disc 44 and located on one side of the reference plane is connected to a first operational amplifier 47, while another electrode in contact with the other side face of the piezo electric disc 44 and located on the other side of the reference plane is connected to a second operational amplifier 48, which combination of the two amplifiers 47 and 48 includes a signal balancing means 49 therebetween comprising one or a pair of variable resistors respectively included in the output ends of the two amplifiers 47 and 48. The other electrodes not connected to the amplifier 47 or 48 are grounded. The output signals from the two amplifiers 47 and 48 are additively combined in such a way that the noise is cancelled therebetween and a resultant alternating electrical signal representing the oscillation in the differential pressure is obtained, wherein the signal level balancing means 49 is used to cancel the noise.

Figure 8:
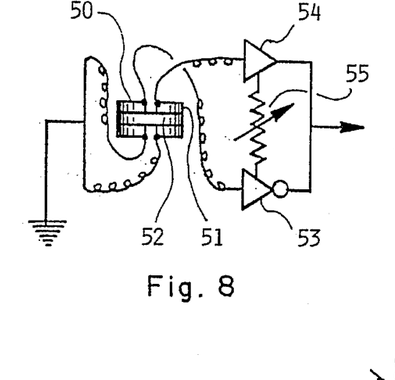
FIG. 8 illustrates another embodiment of the piezo electric transducer usable in place of the embodiment shown in FIG. 7.
Figure 9:
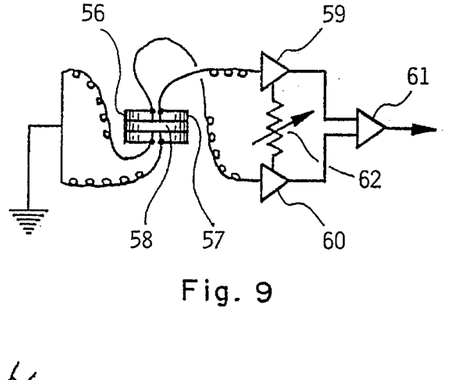
FIG. 9 illustrates a further embodiment of the piezo electric transducer providing essentially the same result as those of the embodiments shown in FIGS. 7 and 8.

In FIG. 8 there is illustrated another embodiment of the piezo electric transducer usable in place of the embodiment shown in FIG. 7. Two electrodes 50 and 51 in contact with the same side face of the piezo electric disc 52 and respectively located on two opposite sides of the reference plane are respectively connected to an inverting and noninverting amplifier 53 and 54, which combination of the two amplifiers has a signal level balancing means 55, while the other electrodes not connected to the amplifier 53 or 54 are grounded. The resultant alternating electrical signal representing the oscillation in the differential pressure is obtained by additively combining the outputs from the two amplifiers 53 and 54 in such a way that the noise is cancelled therebetween In FIG. 9 there is illustrated a further embodiment of the piezo electric transducer providing the same end result as that of the embodiment shown in FIG. 7 or 8. Two electrodes 56 and 57 in contact with the same side face of the piezo electric disc 58 and respectively located on two opposite sides of the reference plane are respectively connected to two operational amplifiers 59 and 60, while other electrodes not connected to the amplifier 59 or 60 are grounded. The resultant alternating electrical signal representing the oscillation in the differential pressure is obtained by differentially combining the outputs from the two operational amplifiers 59 and 60 by using a differential amplifier 61. The signal level balancing means 62 including one or a pair of variable resistors is used to cancel out the noise between the two outputs from the two amplifiers 59 and 60. It should be noticed that, in the embodiments shown in FIGS. 8 and 9, one of the two electrode discs providing the two grounded electrodes may not have the split construction.

Figure 10:
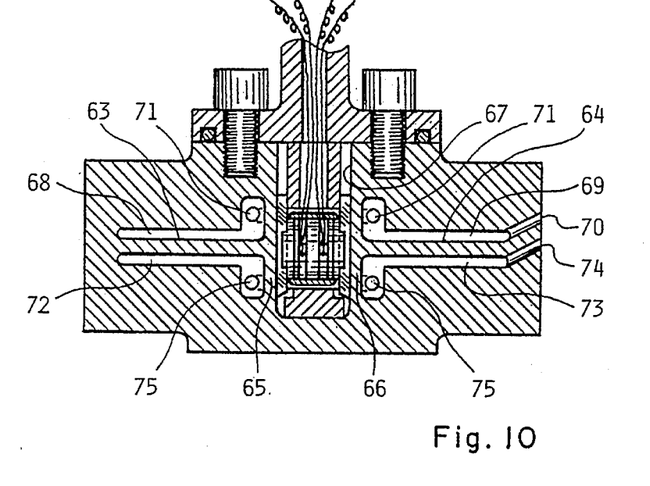
FIG. 10 illustrates a cross section of a further embodiment of the oscillatory pressure sensor of the present invention.

In FIG. 10 there is illustrated a cross section of a further embodiment of the oscillatory pressure sensor of the present invention, which embodiment results when the embodiment shown in FIG. 4 is modified in such a way that the two thin deflective partitioning walls 35 and 36 with the angled extension 43 included therein are now substituted with two thin deflective partitioning walls 63 and 64 having a flat geometry and disposed on the reference plane in a relationship wherein the two thin deflective partitioning walls 63 and 64 extend straight in two opposite directions respectively from the two opposite thin side walls 65 and 66 of the cavity 67 containing the piezo electric transducer. The two pressure compartments 68 and 69 respectively adjacent to the first side surfaces of the two thin deflective partitioning walls 63 and 64, and located on one side of the reference plane receive a first fluid pressure through a first pressure port 70 as these two pressure compartments 68 and 69 are connected to one another by a pressure communicating hole 71, while the other two pressure compartments 72 and 73 respectively adjacent to the second side surfaces of the two thin deflective partitioning walls 63 and 64, and located on the other side of the reference plane receive a second fluid pressure through a second pressure port 74 as these two pressure compartments 72 and 73 are connected to one another by a pressure communicating hole 75.

Figure 11:
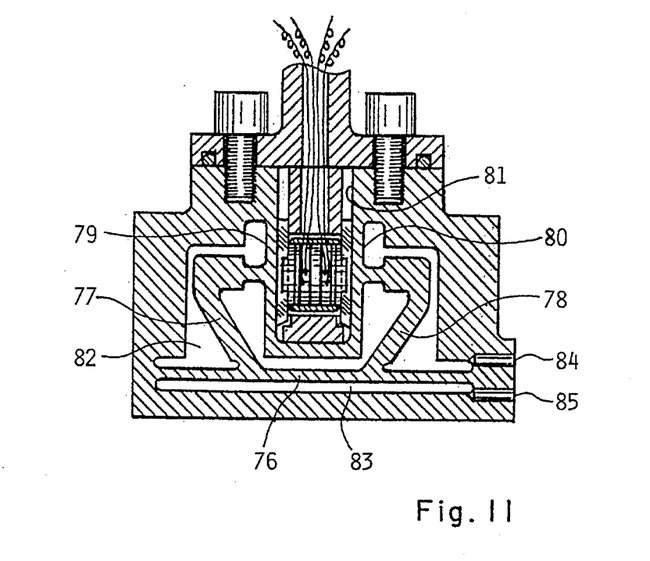
FIG. 11 illustrates a cross section of yet another embodiment of the oscillatory pressure sensor of the present invention.

In FIG. 11 there is illustrated a cross section of yet another embodiment of the oscillatory pressure sensor of the present invention, which embodiment results when the embodiment shown in FIG. 1 is modified in such a way that the two thin deflective partitioning walls 4 and 5 included therein are substituted with a single thin deflective partitioning wall 76 disposed on a plane parallel to and offset from the reference plane, and the two force transmitting members 77 and 78 respectively extending from the two opposite thin side walls 79 and 80 of the cavity 81 containing the piezo electric transducer are connected to a central portion 82 of the single thin deflective partitioning wall 76 that separates two pressure compartments 82 and 83 from one another. Two pressure ports 84 and 85 supply the first and second fluid pressures respectively to the two pressure compartments 82 and 83.

Figure 12:
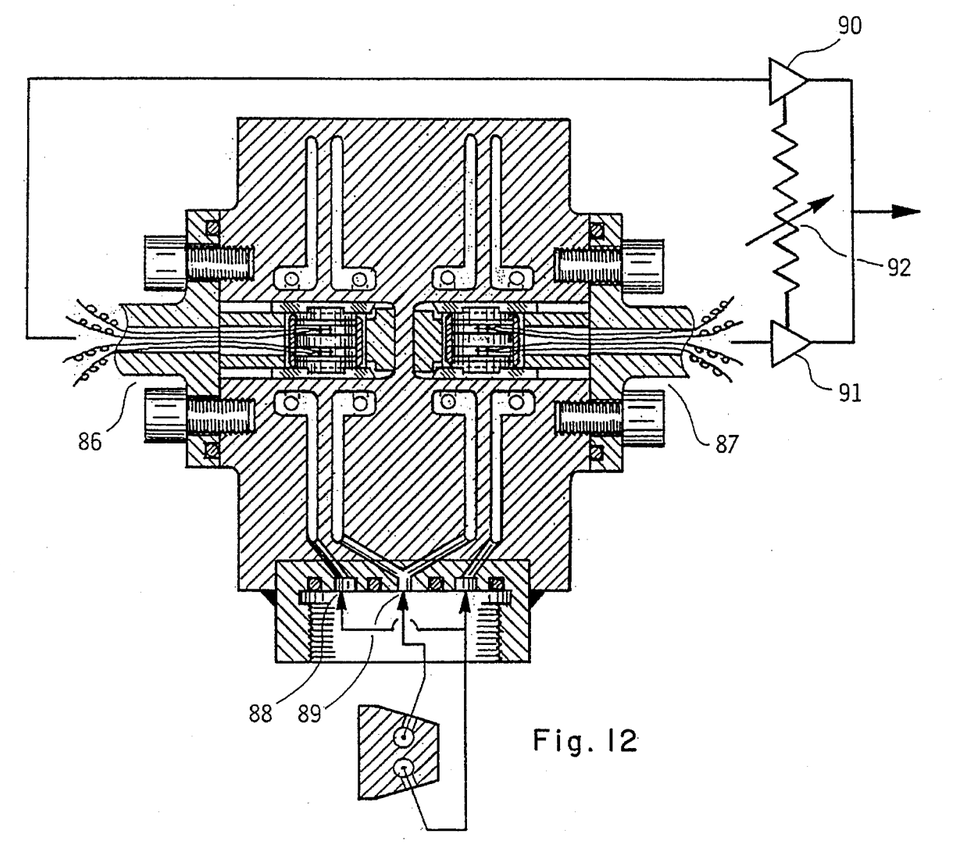
FIG. 12 illustrates a cross section of a compound version of the oscillatory pressure sensor shown in FIG. 10.

In FIG. 12 there is illustrated a cross section of a compound version of the oscillatory pressure sensor shown in FIG. 10. This compound version comprises a pair 86 and 87 of oscillatory pressure sensors having the same construction as the construction of the embodiment shown in FIG. 10, which pair 86 and 87 are disposed preferably in a mirror image to one another on two opposite sides of a plane of symmetry located intermediate and parallel to the two sets of the thin deflective partitioning walls respectively belonging to the pair of oscillatory pressure sensors 86 and 87 or in other configurations, wherein the two pressure ports 88 and 89 supply the two fluid pressures to various pressure compartments in such a way that the differential pressures produces the deflective motions of the two sets of the thin deflective partitioning walls respectively belonging to the pair of oscillatory pressure sensors 86 and 87 in an antisymmetric mode with respect to the plane of symmetry or in two opposite directions, while the mechanical vibrations of the apparatus body produce the deflection of the two sets of the thin deflective partitioning walls in a symmetric mode about the plane of symmetry or in the same direction. Two alternating electrical signals respectively generated by the pair of oscillatory pressure sensors 86 and 87 are combined by using a pair of operational amplifiers 90 and 91 with a signal level balancing means 92 therebetween as shown in the particular illustrative embodiment or by using a differential amplifier in an alternative design, in such a way that the noise is cancelled therebetween and a resultant alternating electrical signal exclusively representing the oscillation in the differential pressure is obtained.

Figure 13:
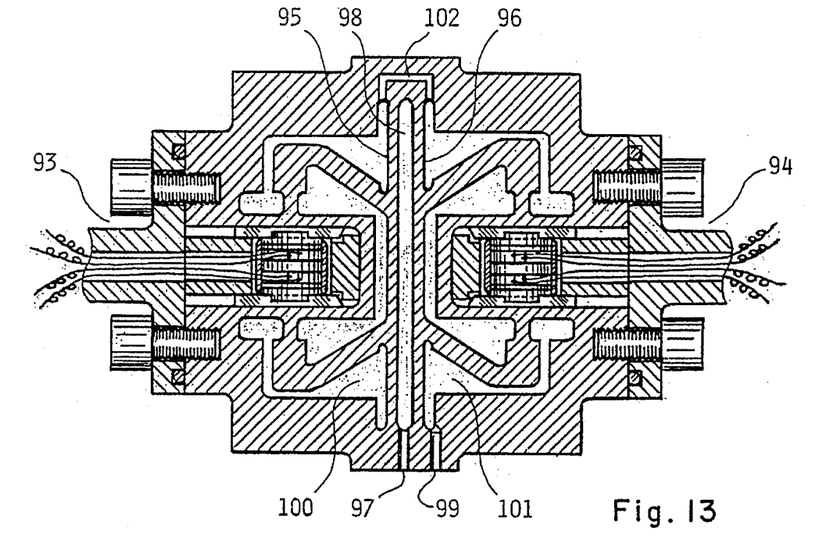
FIG. 13 illustrates a cross section of a compound version of the oscillatory pressure sensor shown in FIG. 11.

In FIG. 13 there is illustrated a cross section of a compound version of the oscillatory pressure sensor shown in FIG. 11. This compound version comprises a pair 93 and 94 of oscillatory pressure sensors having the same construction as the construction of the embodiment shown in FIG. 11, which I pair 93 and 94 are disposed preferably in a mirror image to one another on two opposite sides of a plane of symmetry located intermediate and parallel to the two thin deflective partitioning walls 95 and 96 respectively belonging to the pair of the oscillatory pressure sensors 93 and 94 or in other configurations, wherein a first pressure port 97 introduces a first fluid pressure into a first pressure compartment 98 disposed intermediate and simultaneously adjacent to the two thin deflective partitioning walls 95 and 96, while a second presssure port 99 introduces a second fluid pressure into the combination of a second and third pressure compartments 100 and 101 respectively disposed on two opposite sides of and straddling the combination of the two thin deflective partitioning walls 95 and 96 and the first pressure compartment 97, wherein the second and third pressure compartments 100 and 101 are connected to one another by a pressure communicating hole 102. The oscillating differential pressure produces a relative deflective motion between the two thin deflective partitioning walls 95 and 96, while the mechanical vibrations of the apparatus body produce the deflective motions of the two thin deflective partitioning walls 95 and 96 in unison and, consequently, produce very little relative deflective motion therebetween. Therefore, the combination of two alternating electrical signals respectively generated by the pair of oscillatory pressure sensors 93 and 94 can be combined in a manner similar to that described in conjunction with FIG. 12 to obtain the resultant alternating electrical signal exclusively representing the oscillation in the differential pressure.

While the principles of the present inventions have now been made clear by the illustrative embodiments shown and described there will be many modifications in the structures, arrangements, proportions, elements and materials, which are immediately obvious to those skilled in the art and particularly adapted to the specific working environments and operating conditions in the practice of the inventions without departing from those principles. It is not desired to limit the inventions to the illustrative embodiments and accordingly all suitable modifications and equivalents may be regarded as falling within the scope of the inventions as defined by the claims which follow.

The embodiments of the inventions, in which an exclusive property or privilege is claimed, are defined as follows:

1. An apparatus for converting an oscillation in fluid pressure to an alternating electrical signal comprising in combination:
   a) an apparatus body including at least two pressure compartments respectively receiving a first fluid pressure and a second fluid pressure;
   b) means for supplying the first and second fluid pressures respectively to said at least two pressure compartments;
   c) a first thin deflective planar member with one side exposed to the first fluid pressure contained in one of said at least two pressure compartments and the other side opposite to said one side exposed to the second fluid pressure contained in the other of said at least two pressure compartments;
   d) a second thin deflective planar member with one side exposed to the first fluid pressure contained in one of said at least two pressure compartments and the other side opposite to said one side exposed to the second fluid pressure contained in the other of said at least two pressure compartments; and
   e) transducer means including a first mechanical means for converting a deflective motion of the first thin deflective planar member to a first minute pivotal motion about a first axis that is transmitted to a transducer element included in the transducer means, and a second mechanical means for converting a deflective motion of the second thin deflective planar member to a second minute pivotal motion about a second axis that is transmitted to the transducer element included in the transducer means; wherein the transducer element converts a relative pivotal motion between the first and second mechanical means to an alternating electrical signal representing an oscillation occurring in at least one of the first and second fluid pressures.

2. An apparatus as defined in claim 1 wherein the first mechanical means comprises a first force transmitting member extending from the transducer means and connected to a deflective portion of the first thin deflective planar member, and the second mechanical means comprises a second force transmitting member extending from the transducer means and connected to a deflective portion of the second thin deflective planar member.

3. An apparatus as defined in claim 2 wherein the transducer element comprises at least one piezo electric disc having at least two electrodes respectively disposed on two opposite sides of a reference plane perpendicular to the piezo electric disc and dividing the piezo electric disc into two opposite halves, said combination of the piezo electric disc and the electrodes disposed within a cavity included in the apparatus body in a compressed relationship between two thin walls of the cavity substantially perpendicular to and straddling the reference plane; wherein the first force transmitting member extends from a first of the two thin walls and experiences the first minute pivotal motion about the first axis parallel to a line of intersection between the first thin wall and the reference plane and the second force transmitting member extends from a second of the two thin walls and experiences the second minute pivotal motion about the second axis parallel to a line of intersection between the second thin wall and the reference plane, and said at least two electrodes respectively supply two electric signals which are combined into the alternating electrical signal representing the oscillation in fluid pressure.

4. An apparatus as defined in claim 3 wherein each of the two thin walls includes a reinforcing rib disposed on the reference plane in a relationship diametrically extending across the thin wall, and anchoring each of the first and second force transmitting members.

5. An apparatus as defined in claim 3 wherein the combination of the first force transmitting member and the first thin deflective planar member and the combination of the second force transmitting member and the second thin deflective planar member are disposed in a symmetric relationship about a plane of symmetry located therebetween.

6. An apparatus as defined in claim 5 wherein each of the two thin walls includes a reinforcing rib disposed on the reference plane in a relationship diametrically extending across the thin wall, and anchoring each of the first and second force transmitting members.

7. An apparatus as defined in claim 5 wherein said means for supplying the first and second fluid pressures supply two fluid pressures respectively existing at two opposite cylindrical sides of a vortex generating bluff body respectively into said at least two pressure compartments.

8. An apparatus as defined in claim 3 wherein said combination includes another apparatus having the same construction as the construction of said an apparatus and disposed adjacent to said an apparatus in a mirror image to one another, and means for combining the alternating electrical signal generated by said an apparatus and an alternating electrical signal generated by said another apparatus into a resultant alternating electrical signal representing the oscillation in fluid pressure in such a way that noise created by mechanical vibration of the apparatus body is cancelled between the two alternating electrical signals respectively generated by said a and another apparatus.

9. An apparatus as defined in claim 1 wherein the first mechanical means comprises a first thin wall included in the transducer means anchoring at least a portion of an edge of the first thin deflective planar member, and the second mechanical means comprises a second thin wall included in the transducer means anchoring at least a portion of an edge of the second thin deflective planar member.

10. An apparatus as defined in claim 9 wherein the transducer element comprises at least one piezo electric disc having at least two electrodes respectively disposed on two opposite sides of a reference plane perpendicular to the piezo electric disc and dividing the piezo electric disc into two opposite halves, said combination of the piezo electric disc and the electrodes disposed within a cavity included in the apparatus body in a compressed relationship between the first and second thin walls constituting two opposite portions of wall surrounding the cavity and straddling the reference plane; wherein a junction between the first thin wall and the first thin deflective planar member experiences the first minute pivotal motion about the first axis parallel to a line of intersection between the first thin wall and the reference plane and a junction between the second thin wall and second thin deflective planar member experiences the second minute pivotal motion about the second axis parallel to a line of intersection between the second thin wall and the reference plane, and said at least two electrodes respectively supply two electrical signals which are combined into the alternating electrical signal representing the oscillation in fluid pressure.

11. An apparatus as defined in claim 10 wherein each of the first and second thin walls includes a reinforcing rib disposed on the reference plane in a relationship diametrically extending across the thin wall, and anchoring said at least a portion of an edge of each of the first and second thin deflective planar members.

12. An apparatus as defined in claim 10 wherein the combination of the first thin wall and the first thin deflective planar member and the combination of the second thin wall and the second thin deflective planar member are disposed in a symmetric relationship about a plane of symmetry located therebetween.

13. An apparatus as defined in claim 12 wherein each of the first and second thin walls includes a reinforcing rib disposed on the reference plane in a relationship diametrically extending across the thin wall, and anchoring said at least a portion of an edge of each of the first and second thin deflective planar members.

14. An apparatus as defined in claim 12 wherein said means for supplying the first and second fluid pressures supply two fluid pressures respectively existing at two opposite cylindrical sides of a vortex generating bluff body respectively into said at least two pressure compartments.

15. An apparatus as defined in claim 10 wherein said combination includes another apparatus having the same construction as the construction of said an apparatus and disposed adjacent to said an apparatus in a mirror image to one another, and means for combining the alternating electrical signal generated by said an apparatus and an alternating electrical signal generated by said another apparatus into a resultant alternating electrical signal representing the oscillation in fluid pressure in such a way that noise created by mechanical vibration of the apparatus body is cancelled between the two alternating electrical signals respectively generated by said a and another apparatus.

16. An apparatus for converting an oscillation in fluid pressure to an alternating electrical signal comprising in combination:

a) an apparatus body including at least two pressure compartments respectively receiving a first fluid pressure and a second fluid pressure;

b) means for supplying the first and second fluid pressures respectively to said at least two pressure compartments;

c) a thin deflective planar member with one side exposed to the first fluid pressure contained in one of said at least two pressure compartments and the other side opposite to said one side exposed to the second fluid pressure contained in the other of said at least two pressure compartments; and d) transducer means including a first force transmitting member extending from the transducer means and connected to a deflective portion of the thin deflective planar member in a relationship wherein a deflective motion of the thin deflective planar member creates a first minute pivotal motion of the first force transmitting member about a first axis that is transmitted to a transducer element included in the transducer means, and a second force transmitting member extending from the transducer means and connected to a deflective portion of the thin deflective planar member in a relationship wherein a deflective motion of the thin deflective planar member creates a second minute pivotal motion of the second force transmitting member about a second axis that is transmitted to the transducer element included in the transducer means; wherein the transducer element converts a relative pivotal motion between the first and second force transmitting members to an alternating electrical signal representing an oscillation occurring in at least one of the first and second fluid pressures.

17. An apparatus as defined in claim 16 wherein the transducer element comprises at least one piezo electric disc having at least two electrodes respectively disposed on two opposite sides of a reference plane perpendicular to the piezo electric disc and dividing the piezo electric disc into two opposite halves, said combination of the piezo electric disc and the electrodes disposed within a cavity included in the apparatus body in a compressed relationship between two thin walls of the cavity substantially perpendicular to and straddling the reference plane, wherein the first force transmitting member extends from a first of the two thin walls and experiences the first minute pivotal motion about the first axis parallel to a line of intersection between the first thin wall and the reference plane and the second force transmitting member extends from a second of the two thin walls and experiences the second minute pivotal motion about the second axis parallel to a line of intersection between the second thin wall and the reference plane, and said at least two electrodes respectively supply two electrical signals which are combined into the alternating electrical signal representing the oscillation in fluid pressure.

18. An apparatus as defined in claim 17 wherein each of the two thin walls includes a reinforcing rib disposed on the reference plane in a relationship diametrically extending across the thin wall, and anchoring each of the first and second force transmitting members.

19. An apparatus as defined in claim 17 wherein the thin deflective planar member is disposed on a plane parallel to and offset from the reference plane, and the combination of the first and second force transmitting members and the thin deflective planar member has a construction symmetric about a plane of symmetry located intermediate the two thin walls of the cavity.

20. An apparatus as defined in claim 17 wherein said combination includes another apparatus having the same construction as the construction of said an apparatus and disposed adjacent to said an apparatus in a mirror image to one another in a relationship wherein the thin deflective planar member respectively belonging to said a and another apparatus are disposed parallel to one another, and means for combining the alternating electrical signal generated by said an apparatus and an alternating electrical signal generated by said another apparatus into a resultant alternating electrical signal representing the oscillation in fluid pressure in such a way that noise created by mechanical vibrations of the apparatus body is cancelled between the two alternating electrical signals respectively generated by said a and another apparatus.

* * * * *